United States Patent
Hayakawa et al.

(10) Patent No.: US 8,865,336 B2
(45) Date of Patent: Oct. 21, 2014

(54) SEPARATOR FOR ALKALINE BATTERY, METHOD FOR PRODUCING THE SAME, AND BATTERY

(75) Inventors: Tomohiro Hayakawa, Okayama (JP); Shinya Inada, Okayama (JP); Hideo Hayashi, Okayama (JP); Hiroyuki Kawai, Osaka (JP); Masakazu Nishiyama, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 724 days.

(21) Appl. No.: 12/517,840

(22) PCT Filed: Dec. 7, 2007

(86) PCT No.: PCT/JP2007/001370
§ 371 (c)(1),
(2), (4) Date: Jun. 5, 2009

(87) PCT Pub. No.: WO2008/075457
PCT Pub. Date: Jun. 26, 2008

(65) Prior Publication Data
US 2010/0310921 A1 Dec. 9, 2010

(30) Foreign Application Priority Data
Dec. 20, 2006 (JP) .................................. 2006-342262

(51) Int. Cl.
*H01M 2/16* (2006.01)
*H01M 2/14* (2006.01)

(52) U.S. Cl.
CPC ............ *H01M 2/162* (2013.01); *H01M 2/1626* (2013.01); *H01M 2/1653* (2013.01); *H01M 2/145* (2013.01); *H01M 2/1686* (2013.01); *Y02E 60/12* (2013.01); *Y10S 977/948* (2013.01)
USPC ......... 429/144; 429/145; 264/176.1; 977/948

(58) Field of Classification Search
CPC ... H01M 2/145; H01M 2/162; H01M 2/1626; H01M 2/1686; H01M 2200/00
USPC ............... 429/129, 142, 144, 145; 264/176.1, 264/205, 638, 639
See application file for complete search history.

(56) References Cited

U.S. PATENT DOCUMENTS 4,746,586 A * 5/1988 Mizutani et al. ............... 429/145
5,366,832 A 11/1994 Hayashi et al.
(Continued)

FOREIGN PATENT DOCUMENTS

EP 0 228 603 7/1987
EP 0 572 921 A1 12/1993
(Continued)

OTHER PUBLICATIONS

Derwent Abstract for Mototani et al., JP 10-040898 A.*

(Continued)

*Primary Examiner* — Edu E Enin-Okut
(74) *Attorney, Agent, or Firm* — Oblon, Spivak, McClelland, Maier & Neustadt, L.L.P.

(57) ABSTRACT

Provided is a separator for alkaline batteries which can not only prevent batteries from internal short circuit by inhibiting the dendrite formation at anode, but also enables to have a low electrical resistance. The separator for alkaline batteries comprises a composite sheet in which a base layer comprising a wet-type nonwoven material formed from alkaline resistant fibers is covered with a nanofiber layer comprising a modified polyvinyl alcohol fiber which has a fiber diameter of 10 to 1000 nm and a liquid absorption amount by fibers of 4.0 to 40.0 g/g after immersion in a 35% aqueous solution of KOH.

18 Claims, 1 Drawing Sheet

(56) References Cited

U.S. PATENT DOCUMENTS

| | | | |
|---|---|---|---|
| 6,379,836 B1 | 4/2002 | Kubo et al. | |
| 7,112,389 B1 * | 9/2006 | Arora et al. | 429/128 |
| 7,875,380 B2 * | 1/2011 | Chun et al. | 429/145 |
| 2002/0100725 A1 | 8/2002 | Lee et al. | |
| 2005/0079781 A1 | 4/2005 | Tsujimoto et al. | |
| 2007/0196401 A1 | 8/2007 | Naruse et al. | |

FOREIGN PATENT DOCUMENTS

| | | | | |
|---|---|---|---|---|
| JP | 57 105957 | | 7/1982 | |
| JP | 57 105958 | | 7/1982 | |
| JP | 62-154559 | | 7/1987 | |
| JP | 2 78150 | | 3/1990 | |
| JP | 6 163024 | | 6/1994 | |
| JP | 10040898 A | * | 2/1998 | H01M 2/16 |
| JP | 10 92411 | | 4/1998 | |
| JP | 2001 76702 | | 3/2001 | |
| JP | 2001 110390 | | 4/2001 | |
| JP | 2002-249966 | | 9/2002 | |
| JP | 2003-86163 | | 3/2003 | |
| JP | 2004 316022 | | 11/2004 | |
| JP | 2005-11726 | | 1/2005 | |
| JP | 2005 264420 | | 9/2005 | |
| JP | 2006-89851 | | 4/2006 | |
| JP | 2006 244804 | | 9/2006 | |
| WO | WO 03/043103 A2 | | 5/2003 | |

OTHER PUBLICATIONS

Machine translation for Mototani et al., JP 10-040898 A.*
U.S. Appl. No. 12/759,772, filed Apr. 14, 2010, Hayakawa et al.
Japanese Decision of Grant issued Oct. 5, 2010, in Patent Application No. 2008-550040.
Extended European Search Report issued Apr. 20, 2012, in Patent Application No. 07849803.7.
U.S. Appl. No. 13/823,128, filed Mar. 14, 2013, Hayakawa, et al.
Chinese Office Action issued Feb. 11, 2011, in Chinese Patent Application No. 200780046228.2.
English Translation of Relevant Portions of the Chinese Office Action dated Feb. 11, 2011, in Chinese Patent Application No. 200780046228.2.
U.S. Appl. No. 13/414,030, filed Mar. 7, 2012, Hayakawa, et al.

* cited by examiner

SEPARATOR FOR ALKALINE BATTERY, METHOD FOR PRODUCING THE SAME, AND BATTERY

CROSS-REFERENCE TO RELATED APPLICATIONS

This application is a 371 of PCT/JP07/001370 filed Dec. 7, 2007 and claims the benefit of JP 2006-342262 filed Dec. 20, 2006.

FIELD OF THE INVENTION

The present invention relates to a separator for alkaline batteries applicable to alkaline primary batteries, such as alkaline-manganese batteries, mercury batteries, silver oxide batteries, or gas-zinc batteries, and to a method for producing the same, and also to an alkaline primary battery utilizing the same. More particularly, the present invention relates to a separator for alkaline primary batteries in which the separator comprises a wet-type nonwoven fabric containing alkali-resistant fibers and a specific nano-fibrous layer joined to the nonwoven fabric, and the nano-fibrous layer exhibits highly absorptive characteristics on alkaline electrolyte and is excellent in blocking effects as well as retention of the electrolyte.

BACKGROUND ART

In general, an alkaline primary battery comprises a separator between a cathode active material and an anode active material for separating these materials. Such a separator need to satisfy various characteristics such that:
(1) preventing internal short circuit between the cathode and anode materials,
(2) enhancing absorption of electrolytes for sufficient electrogenic reaction as well as having a good ion conductivity to cause low electric resistance,
(3) requiring only small space in batteries, resulting in having the amount of cathode and anode active materials increased inside the battery (i.e., prolonging the life time of the battery), and so on.

For example, Japanese Laid-open Patent Publication No. 6-163024 discloses a separator for batteries in order to satisfy the above requirements. The separator comprises a polyvinyl alcohol fiber and a cellulose fiber in combination, in which the polyvinyl alcohol fiber is excellent in chemical resistance, hydrophilic property, and mechanical property, and the cellulose fiber is used for enhancing absorption of electrolyte. The separator disclosed therein can, however, exhibit some disadvantageous characteristics that the separator produces a short circuit failure due to needle-like zinc oxide deposition, (i.e., dendrite formation) by an action of aluminum added to zinc which constitutes an anode. The aluminum is added for reducing the hydrogen generation in the electrolyte, but it also causes the dendrite. As a result, the battery using the separator induces an unusual voltage reduction, and the lifetime of the battery would be reduced.

Conventional alkaline-manganese batteries include a cathode mix of manganese dioxide and graphite and a separator comprising synthetic fibers and cellulose fibers. However, under high temperature storage, the cellulose fibers existing on the contact surface of the cathode mix are degraded by oxidation, and the decline of cathode capacity due to the cellulose fiber degradation would cause deterioration of the battery performance.

In addition, it would be desirable to have an alkaline battery that would provide improved battery performance characteristics, as various digital equipments have been rapidly widespread and increasingly sophisticated in recent years. Since the digital equipments utilizing these batteries need greater and greater electric power supplies, it would be desirable to have a battery excellent in discharge performance under high loading. Responding to such a request, an alkaline battery which is improved in discharge performance under high loading has been put to a practical use. Such a battery using a cathode active material comprising manganese dioxide in combination with nickel oxyhydroxide, however, exhibit some disadvantageous characteristics that the nickel oxyhydroxide, showing higher oxidizability than manganese dioxide, attacks cellulose fibers in the separator which exist on the contact surface of the cathode mix. As a result, the cellulose fibers are extremely rapidly degraded by oxidation and the performance of the battery is decreased under high loading.

In order to prevent internal short circuit between cathode and anode active materials, Japanese Laid-open Patent Publication No. 10-92411 suggests a battery separator having a bilayer structure in which a dense layer having a high fiber density and a rough layer (for storage a liquid material) having a low fiber density are used in combination. The separator is made from a refined polyvinyl alcohol fiber and a refined cellulose fiber as an alkali-resistant fiber.

However, in the above-mentioned separator, it is difficult to achieve a good balance between the liquid storage and the prevention of internal short circuit. The higher proportion of the dense layer in the separator would prevent short circuit caused by dendrite formation, but the separator was deteriorated in liquid storage ability. As a result, exhaustion (i.e., dry-out) of the liquid material can cause internal short circuit and adversely affect the battery life. Further, if the dense layer utilizes highly refined cellulose fibers, the separator not only reduces its strength, but also easily buckles by vibration or fallen impact on transferring or carrying the battery, resulting in internal short circuit in the battery. Moreover, the cellulose fibers on the contact surface with manganese dioxide as a cathode active material are degraded by oxidation, thereby the battery life becomes shorten. The tendency of oxidation degradation of the cellulose fibers is severer in high performance batteries which utilize a cathode mix comprising nickel oxyhydroxide which is excellent in discharge performance under high loading, and the degradation of the cellulose fibers can cause declining of the discharge performance under high loading of the battery.

On the contrary, in order to prevent internal short circuit of batteries, there has been adopted a separator comprising a paper substrate containing an alkali-resistant fiber and a cellulose fiber, in combination with a cellophane film. However, the separator is deteriorated in liquid storage capacity, and needs a number of paper substrates to ensure sufficient liquid storage amount. Therefore, the volume of the separator inside the battery has increased, and thereby this increase in volume of the separator significantly restricts the amounts of cathode and anode active materials in the battery. Further, the distance between the cathode and the anode would be longer by the separator which uses the cellophane film and increases the volume of the paper substrates, and the battery can invite rise in internal resistance. Accordingly, it has been found difficult to obtain a battery with high discharge performance.

Japanese Laid-open Patent Publications No. 57-105957, No. 57-105958 and No. 2-78150, for example, disclose a separator for batteries, which comprises a cross-linked high water-absorption polymer which is allowed to be applied or immersed in the rate of 0.5 to 10.0 $g/m^2$. However, the separator disclosed therein cannot inhibit the dendrite formation, and has problems in that the separator is unable to sufficiently suppress short circuit due to dendrite formation and causes internal short circuit in the battery.

Further, Japanese Laid-open Patent Publications No. 2005-264420 and No. 2006-244804, for example, disclose a separator comprising a fiber having a nano-level diameter (hereinafter referred to as a nanofiber). The nanofibers in the separator disclosed therein are effective in prevention of the internal short circuit caused by the dendrite formation. However, absorption of electrolyte only depends on capillary action of minute void spaces in the nanofibers, and the nanofibers cannot absorb the electrolyte by themselves. As a result, it is difficult to prevent the separator from the electrolyte dry-out at the end of discharge.

DISCLOSURE OF THE INVENTION

An object of the present invention is, in view of the problems described above, to provide a separator for alkaline batteries which effectively prevents the internal short circuit of the separator by inhibiting the dendrite formation in the anode as well as lowers the electrical resistance of the separator itself.

Another object of the present invention is to provide a separator for alkaline batteries which not only enhances absorption of the electrolyte but also stores the electrolyte for a long time.

Still other object of the present invention is to provide a separator for alkaline batteries which ensures increased capacity for cathode and anode mixes in the battery cell by restraining increase in thickness of the separator even after absorbing the electrolyte.

Yet other object of the present invention is to provide a separator for alkaline batteries which is hardly degraded by oxidation from manganese dioxide or nickel oxyhydroxide mixture utilized in a cathode mix even at high temperatures, and resulting in achieving a prolonged battery life.

In order to accomplish the foregoing objects of the present invention, the inventors of the present invention did intensive studies and finally found that if a base nonwoven layer comprising a wet-type nonwoven material made of an alkaline resistant fiber is overlaid with a nanofiber layer comprising a modified polyvinyl alcohol polymer nanofiber excellent in absorption as well as retention of an alkaline electrolyte by an electro spinning method, to give a composite sheet comprising the base nonwoven layer and the nanofiber layer unified with the base layer, the nanofiber in a continuous form can be strongly supported by the base layer. As a result, (i) the composite sheet (or separator) can effectively inhibit the dendrite formation in the battery by blocking voids of the base layer with the nanofiber layer having not only a nano-sized minute fineness of the nanofiber but also a dense structure caused by electrolyte-swelling nanofiber voids, (ii) it can retain high absorption of the electrolyte for a long time and effectively inhibit the decline of the battery performance at the end of discharge, and (iii) it is hardly degraded by oxidation due to manganese dioxide cathode or nickel oxyhydroxide mixture which is a strong oxidizing agent.

That is, the present invention is a separator for alkaline batteries having a composite sheet structure, comprising:

a polyvinyl alcohol nanofiber layer formed from a modified polyvinyl alcohol polymer and having a fiber diameter of 10 to 1000 nm, the nanofiber layer having a liquid absorption amount by fibers of 4.0 to 40.0 g/g after immersion in a 35% aqueous solution of KOH; and a base layer joined to the nanofiber layer, the base layer comprising a wet-type nonwoven material made of alkaline resistant fibers.

In the separator, the modified polyvinyl alcohol polymer may comprise an unsaturated carboxylic acid as the modifying component, and the base layer may comprise at least one alkaline resistant fiber selected from the group consisting of an alkaline resistant synthetic fiber and an alkaline resistant cellulose fiber. If necessary, the base layer further may comprise a polyvinyl alcohol binder.

In the separator, since the nanofiber layer is unified to the base layer to the composite sheet (bi-layer sheet), the composite sheet may have a peeling strength for separating the nanofiber layer from the base layer of about 10 to 100 g/30 mm.

Further, the composite sheet may have a liquid absorption amount by fibers of about 1.0 to 3.0 g/g after immersion in a 35% aqueous solution of KOH, and the composite sheet may have a rate of change in air permeability of about 30 to 300% between before and after immersion of a 35% aqueous solution of KOH.

Furthermore, in the composite sheet, the nanofiber layer may have a thickness of about 0.5 to 30 μm, and the base layer may have a thickness of about 3- to 70-folds of that of the nanofiber layer. Moreover, the nanofiber layer may have a basis weight of about 0.1 to 10 g/m$^2$, and the base layer may have a basis weight of about 2- to 35-folds of that of the nanofiber layer. Further, in the composite sheet, the nanofiber layer may have a density of about 0.2 to 0.7 g/cm$^3$, and the proportion of the density of the base layer relative to that of the nanofiber layer may be (base layer density)/(nanofiber layer density)=about 0.2 to 0.9.

The present invention also includes a method for producing the separator for alkaline batteries, and the method comprising:

(A) a step for preparing a spinning solution by dissolving a modified polyvinyl alcohol polymer in a solvent which is capable of dissolving the polymer, and (B) a step for forming polyvinyl alcohol nanofibers from the solution using an electro spinning method thereby forming a nanofiber layer onto a base layer to produce a composite sheet. Further, the present invention also includes a battery including the above-mentioned separator for alkaline batteries.

It is to be noted that in the specification of the present invention the term "wet-type nonwoven material" denotes an fiber aggregation (or paper layer) which is formed by dispersing fibers in a liquid such as water or the like and then by laying the dispersed fibers on a mesh filter. In addition, the absorbed amount in fibers means the liquid content (the amount of liquid) absorbed in the fibers themselves, and substantially excludes the liquid absorbed in the void spaces in the fibers by eliminating the liquid using a centrifugal dehydration method or the like.

EFFECT OF THE INVENTION

According to the present invention, since the continuous nanofibers having high absorbing ability of alkaline electrolytes are unified with and supported by the base layer, the improvement in blocking effect by high absorption of the electrolyte in the nanofibers contributes not only to inhibit internal short circuit by suppressing dendrite formation but also to lower the electric resistance of the separator itself.

Moreover, unification between the modified PVA nanofiber layer and the alkaline resistant nonwoven layer ensures not only enhancement in entire absorption of the electrolyte in the separator but also retention of the electrolyte for a long time, resulting in effective prevention of the battery from decline of the battery performance at the end of discharge.

Further, by unifying the modified polyvinyl alcohol nanofiber layer having a specific absorptive property with the alkaline resistant nonwoven layer, even under high temperatures, the separator is insusceptible to oxidation degradation caused by the cathode mix, as well as is capable of suppressing increase in thickness after absorbing electrolyte. As a result, the separator contributes to enlargement of the capacity for cathode and anode mixes in the battery and ensures improvement in discharge characteristics of the battery.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

BEST MODE FOR CARRYING OUT THE INVENTION

A preferred embodiment of the present invention will now be described in more detail. The separator of the present invention has a composite sheet structure and comprises a polyvinyl alcohol nanofiber layer and a base layer comprising a nonwoven material joined to the nanofiber layer.

(PVA Nanofiber Layer)

The polyvinyl alcohol nanofiber layer of the present invention comprises a polyvinyl alcohol polymer (hereinafter referred to as PVA polymer). The PVA polymer is, for example, producible by saponifying a polyvinyl ester obtained by polymerization of a vinyl ester monomer. The vinyl ester monomer used for producing the PVA polymer may include vinyl acetate, vinyl formate, vinyl propionate, vinyl butyrate, vinyl pivalate, vinyl laurate, vinyl stearate, vinyl benzoate, and the like. Among them, vinyl acetate is preferable from the viewpoint of productivity.

In view of achieving high liquid retention in alkaline electrolytes as a separator for batteries, the PVA polymer is modified with a modifying component (modifying agent) in order to allow the modified PVA nanofiber to have a liquid absorption amount by fibers of 4.0 to 40.0 g/g after immersion in a 35% aqueous solution of KOH. The modifying component may include, for example, an unsaturated carboxylic acid or a derivative thereof, an unsaturated sulfonic acid or a derivative thereof, a borane acid complex or a derivative thereof, a vinyl ester (e.g., vinyl acetate, vinyl butylate, or vinyl pivalate), an amine (e.g., a vinyl amine), an acrylamide, a methacrylamide, an allyl alcohol, vinyl pyrrolidone, and the like. These modifying components can be used singly or in combination. Among them, the preferred modifying component includes an unsaturated carboxylic acid or a derivative thereof.

The unsaturated carboxylic acid to be used for modification is not particularly limited to a specific one as far as it enhances absorption of the alkaline electrolytes in the separator, and may include, for example, an unsaturated monobasic carboxylic acid (for example, acrylic acid, methacrylic acid, or crotonoyl acid), an unsaturated dibasic carboxylic acid (for example, itaconic acid, maleic acid, or fumaric acid), and the like. The derivatives thereof may include, for example, a salt (for example, a sodium salt, a potassium salt, or a magnesium salt), an ester (for example, a methyl ester, an ethyl ester, or a t-butyl ester), an anhydride (for example maleic anhydride, or itaconic anhydride), and others. These unsaturated carboxylic acids and the derivatives thereof can be used singly or in combination. Among them, the preferred one includes unsaturated dibasic carboxylic acids such as maleic acid and itaconic acid.

Such a modified PVA polymer is producible by a known method, for example, may be produced by copolymerization of the vinyl ester with the modifying component to give a modified polyvinyl ester, and subsequently by saponification of the modified polyvinyl ester; or may be produced by graft polymerizing the modifying component to an unmodified PVA polymer. The modification degree of the modified PVA polymer may be preferably 15 mol % or lower, and more preferably 5 mol % or lower.

Such a modified PVA polymer can enhance the absorption of electrolytes in the nanofiber comprising the modified PVA polymer compared to the unmodified PVA polymer, and can effectively inhibit the electrolyte dry-out (deficit) phenomenon in the battery at the end of the charge/discharge period. Further, even if the thickness of the nanofiber layer is reduced, the separator ensures improved blocking effect on the dendrite formation.

The PVA polymer may contain other monomers as a copolymerizable component, and such a copolymerizable monomer may include an olefin (e.g., a $C_{2-6}$ olefine such as ethylene or propylene), and others. In view of mechanical properties for practical use, the PVA polymer preferably contains a vinyl alcohol unit as a constitutive component at 40 mol % or higher in all constitutive components.

The polymerization degree of the PVA polymer is not particularly limited to a specific one, and from the viewpoint of mechanical properties for practical use, the PVA polymer preferably has a viscosity-average polymerization degree of 1000 or higher, and particularly 1500 or higher. Further, in view of spinnability and cost saving measures, the PVA polymer preferably has a viscosity-average polymerization degree of 5000 or lower.

Moreover, the PVA polymer preferably has a saponification value of 50 mol % or higher, more preferably 65 mol % or higher, and further preferably 80 mol % or higher. The PVA polymer having the above saponification value can be protected against further saponification in alkaline electrolytes, and attain increase in swelling amount of the PVA polymer fibers. Accordingly, the separator can effectively prevent the electrolyte dry-out at the end of discharge and prolongs the duration of the battery life.

As far as the range which does not deteriorate the effect of the present invention, the PVA nanofiber may contain a polymer other than the PVA polymer, and/or an additive. From the viewpoint of fiber performance, the percentage of the PVA polymer in the fiber may be preferably 30 mass % or higher, and more preferably 50 mass % or higher.

In the battery separator, it is important to form fine void spaces in the fibers in order to suppress the internal short circuit. The preferable fiber diameter to produce this size of void includes about 10 to 1000 nm, preferably about 30 to 800 nm, more preferably about 100 to 500 nm. In the case where the fiber having a diameter of larger than 1000 nm is utilized, the size of the void spaces in the fibers becomes too large, and may decrease blocking effect in the separator even after the fibers absorb alkaline electrolytes. As a result, the separator considerably reduces the suppressive activity of the internal short circuit. The fiber having a smaller diameter generally contributes to the reduction of the void size, and therefore a fiber having a smaller diameter is preferable. However, in the case where the fiber having a diameter of smaller than 10 nm is utilized, the size of the voids between the fibers becomes too small, and may increase internal resistance of the separator. Accordingly, such a separator may lower the battery performance by contraries.

It should be noted that the fiber diameter in the present invention denotes the average fiber diameter of 50 fibers which are randomly selected from the fiber aggregate. Diameters of each fiber are measured with a scale using a cross sectional view of an electron micrograph at 5000-fold magnification.

Then, a method for producing a nanofiber used in the present invention will now be described in more detail. A PVA polymer is allowed to be dissolved in a solvent to prepare a PVA polymer solution. As the solvent, there may be exemplified water, an organic solvent (for example, a sulfoxide such as dimethylsulfoxide, an amide such as dimethylformamide or dimethylacetoamide), and an aqueous solvent (for example, a mixture of water and an organic solvent, a mixture of water and an alkali, a mixture of water and an acid). The PVA polymer is added into the above solvent, and the mixture is uniformly mixed until the gel-like matter in the solvent is disappeared, and thereby a spinning solution is obtained. Among them, water is preferred in terms of not only the least effect on the environment but also the solubility to the PVA polymers.

Subsequently, with the spinning solution containing the PVA polymer, the PVA polymer is spun into the form of nanofiber, and a layer of the PVA nanofiber is unified to a base nonwoven layer by covering the base polymer with the PVA nanofiber layer using an electro spinning process. The method for electro spinning is not particularly limited to a specific one, and a known method can be used as far as the obtained nanofiber has a continuous form. For example, the preferred method may include a process which comprises applying a high voltage to a conductive member (nozzle) which supplies the spinning solution, and allowing an aggregation of continuous nanofibers from the spinning solution to be deposited on the base layer which is put on another conductive member being grounded. In this method, the spinning solution supplied from the solution-supplying element squirts out of the nozzle, and then the expelled solution is charged with electricity to be split up. Thereafter, by the action of the electrical field, the electricity-charged spinning solution is drawn to form a number of continuous fibers even from a drop of solution, and subsequently the split fibers are uniformly spread to the base layer.

The concentration of the PVA polymer in the spinning solution can be adjusted depending on factors such as the electrical charge amount of the solution drop and the spinning speed (flow speed). From the viewpoint of forming the nanofibers, the concentration of the PVA polymer in the spinning solution is preferably about 4 to 13.5 mass % and more preferably about 5 to 12.5 mass %.

Further, the surface tension of the spinning solution can be varied by factors such as the concentration of the spinning solution and the temperatures of the spinning solution. The preferred surface tension may be, for example, about 10 to 80 dyne/cm, and more preferably about 20 to 70 dyne/cm in view of improvement in formation of fibers in the electrical charge.

Furthermore, from the viewpoint of improvement in not only bonding between the nanofibers but also unification of the nanofiber layer with the base layer, the spinning solution is usually spun at ambient temperatures. The distance between the nozzle and the base layer can be selected in the range between several centimeters and several tens of centimeters depending on the concentration of the spinning solution or the voltage applied to the nozzle.

Figure 1:
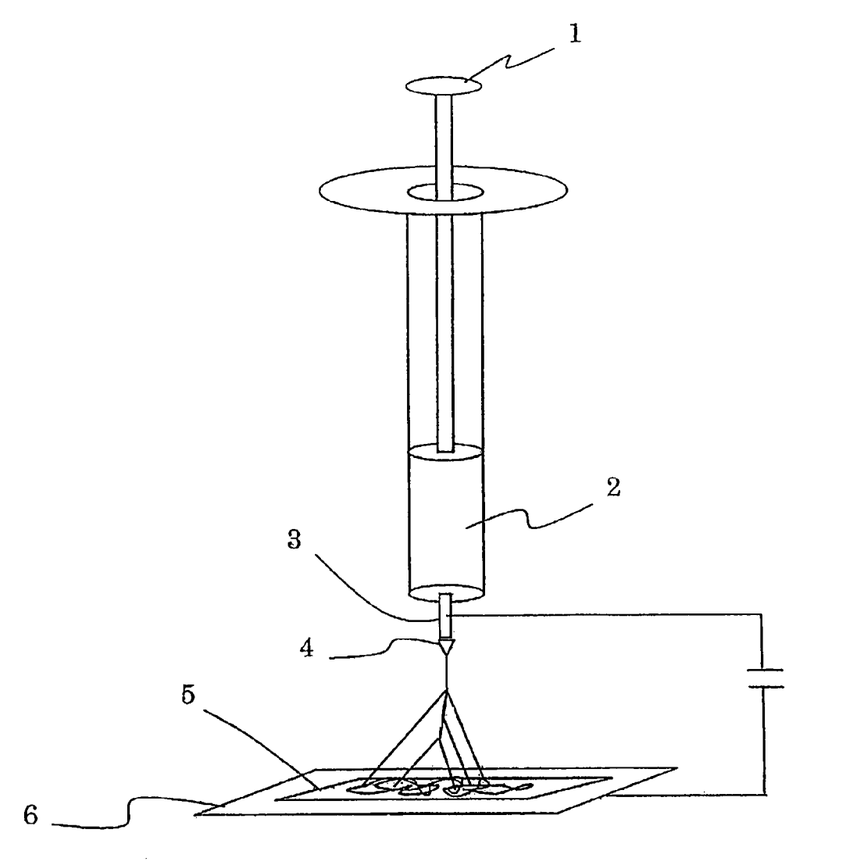
FIG. 1 is a schematic diagram showing a spinning machine which spins nanofibers from a spinning solution to give a nanofiber layer which is unified with a base layer comprising a nonwoven material.

The preferred method for producing the separator using the nanofibers of the present invention will now be described with the particular reference to FIG. 1. FIG. 1 shows illustrates a schematic diagram showing a process for covering a base layer with a nanofiber layer formed from a spinning solution.

In FIG. 1, a spinning solution 2 which contains a dissolved PVA polymer is fed to a nozzle 3 in a predetermined amount measured with a constant rate pomp 1. It should be noted that the spinning solution 2 is controlled to have a uniform pressure and liquid amount distribution with a distributing and rectifying means (not shown), and fed into the nozzle 3 having a hollow tip. The nozzle 3 is made of a conductive material, and is connected to one output terminal of a power source which supplies a high voltage direct current. The other output terminal of the power source is connected to a conductive member 6 on which a base layer 5 is set. It should be noted that the earthing of this conductive member 6 can neutralize the electrical potential applied to the conductive member 6.

The application of a high voltage to the nozzle 3 makes a drop of the spinning solution which is extruded from the tip 4 of the nozzle 3 into the form of an acute inverted cone, and then this drop is led to the earthed conductive member 6 usually in the form of a continuous single fiber. Subsequently, at some positions between the nozzle 3 and the base layer 5, the single fiber splits into finer fibers due to the electrical charge and each of the split fibers is led to the base layer 5 in a continuous form with creating spiral shapes. Thereby, the split and extended nanofibers are uniformly deposited on the base layer 5 on the conductive member 6.

In particular, in the present invention, the fiber spinning at ambient temperatures contributes to provide nanofibers which still contain a volatile solvent inside at the time of deposition. As a result, the deposited nanofibers can internally bond (or agglutinate) with each other, as well as can join to the base layer. The repeated depositions of nanofibers one after another accomplish a uniform nanofiber layer having a dense structure, and thereby producing the separator with a composite sheet structure in which the nanofiber layer is strongly bonded to and unified with the base layer.

(Base Layer)

Turning now to a base layer, the base layer to be overlaid with nanofibers will be described. The base layer comprises a nonwoven material made using a wet process, and the nonwoven material comprises an alkali-resistant fiber as the main fiber. The alkaline resistant fiber is not particularly limited to a specific one as far as the fiber has an alkaline resistant property, and the base layer usually comprises at least one alkaline resistant fiber selected from the group consisting of an alkaline resistant synthetic fiber and an alkaline resistant cellulose fiber.

The alkali-resistant synthetic fiber may include, for example, at least one fiber selected from the group consisting of a PVA fiber, an ethylene-vinyl alcohol copolymer fiber, a polypropylene fiber, a polyethylene fiber, a polyamide fiber, a polypropylene/polyethylene composite fiber, a polypropylene/ethylene-vinyl alcohol copolymer composite fiber, and a polyamide/modified polyamide composite fiber. These fibers can be used singly or in combination. Among these fibers, the PVA fibers are preferred in view of excellent affinity for the nanofiber layer as well as good affinity (wettability) for electrolytes.

In the present invention, in the case where the base nonwoven layer contains the PVA fibers as the main fiber thereof, the PVA fibers preferably has a water dissolution temperature of 90° C. or higher, particularly 100° C. or higher. In particular, the PVA fibers preferably comprises a PVA polymer which has an average polymerization degree of about 1000 to 5000, and a saponification value of about 95 mol % or higher. This PVA polymer may be copolymerized with other copolymerizable component(s). The copolymerizable component may include, for example, an olefin (for example, $\alpha$-$C_{2-6}$olefine) such as ethylene, propylene, 1-butene, or isobutene; acrylic acid and the salt thereof; a vinyl ether such as methyl vinyl ether, ethyl vinyl ether, t-butyl vinyl ether, dodecyl vinyl ether, or stearyl vinyl ether; a nitrile such as acrylonitrile or methacrylonitrile. Among them, the preferred one includes the $\alpha$-olefins, and particularly ethylene. In view of water resistance, the PVA polymer preferably has a copolymerizing degree (modification degree) of about 20 mol % or lower, and particularly about 10 mol % or lower. In addition, the PVA polymer may be subsequently subjected to a treatment such as acetalization.

The PVA fiber does not necessarily consist of a PVA polymer, and may comprise a polymer other than the PVA polymer, or may be a bicomponent (conjugated) fiber with other polymer(s), or a blend fiber (the fiber having a sea-islands structure). From the viewpoint of good electrolyte absorption, the PVA fiber preferably contains the PVA polymer at a content of about 30 mass % or higher, particularly about 50 mass % or higher, and especially about 80 mass % or higher.

The fineness of the fiber may be preferably about 3.3 dtex or lower, and particularly about 1.5 dtex or lower in view of realizing the good separating property and/or thinness of the separator. The fineness of the fiber may be preferably about 0.01 dtex or higher, and particularly about 0.07 dtex or higher for the efficient paper-making process using the fibers. The length of the fiber may be adjusted depending on the fineness of the single fiber, and may be preferably about 0.5 to 10 mm, particularly about 1 to 5 mm for the efficient paper-making process and the like.

The examples of the alkaline resistant cellulose fibers may include a rayon fiber (for example, an organic solvent-spun rayon fiber, a polynosic rayon fiber), an acetate fiber, a mercerized natural pulp (e.g., a wood pulp, a cotton linter pulp, a hemp pulp), and the like. These alkaline resistant cellulose fibers may be used singly or in combination. Among these cellulose fibers, the preferred one includes the organic solvent-spun rayon fiber which is spun from an organic dissolving agent (for example, N-methylmorpholine-N-oxide, and lithium chloride/N,N-dimethylacetamide), and the mercerized natural pulp.

These alkaline resistant cellulose fibers may be allowed to be fibrillated. In the fibrillation, one kind of fiber or two or more kinds of fibers are dispersed in water, and the resultant dispersion mixture is refined at a predetermined fiber freeness with a papermaking refining machine such as a beater, a disk refiner, or a high-speed refining machine. In the case of using the fibrillatable alkali-resistant cellulose fibers, it is preferred that the fibrillated fibers have a refining degree in a CSF value of 0 to 700 mL, more preferably 0 to 550 mL. It should be noted that the definition of the fiber freeness here is a value determined by CSF (Canadian standard fiber freeness; Canadian Standard Freeness) in accordance with a method of Canadian standard described in Japanese Industrial Standards P 8121.

The base nonwoven layer used in the present invention may contain, if necessary, a binder in addition to the main fiber. Such a binder may include a PVA binder in view of alkali-resistant property as well as electrolyte-absorptive property. Moreover, if necessary, a small amount of an olefin (for example a $C_{2-4}$olefine) having the alkali-resistant ability may be added to the binder.

The form of the binder may include a fiber, a powder, a solution, and others, and in the case of obtaining the base nonwoven layer by a wet papermaking process, the binder preferably has a fiber form. The binder fibers can keep their fiber form by controlling the water content in the pre-dried binder fiber not to be dissolved completely in the paper-making process, and can join to only intersection points between the main fibers and binder fibers. As a result, the binder fiber can maintain the strength of the separator which neither decreases its electrolyte absorption nor increases internal resistance of the battery.

In the case of using the PVA binder fibers as the binder, the PVA binder fiber preferably has a water dissolution temperature of about 60 to 90° C., and more preferably of about 70 to 90° C. Further the PVA binder fiber preferably comprises a PVA polymer having an average polymerization degree of 500 to 3000, and a saponification value of 97 to 99 mol %.

As a matter of course, the binder fiber may be a bicomponent (conjugated) fiber with other polymer(s), or a blend fiber (the fiber having a sea-islands structure). In view of the factors such as good absorption of electrolytes and mechanical property of the separator, the binder fiber may be a PVA binder fiber comprising a PVA polymer at a content of about 30 mass % or higher, particularly about 50 mass % or higher, and especially about 80 mass % or higher.

The fineness of the binder fiber may be preferably about 0.01 to 3 dtex in view of factors such as water dispersion of the binder fiber, binding affinity for other component, and pore size. The fiber length is preferably about 1 to 5 mm. Needless to say, the binder fiber may contain fiber(s) other than above-described fiber.

The base nonwoven layer may preferably contain the alkaline resistant cellulose fiber, for example, at a content of about 0 to 70 mass %, and more preferably at a content of about 20 to 60 mass %. Too much content of the alkaline resistant cellulose fibers may weaken the strength of the separator; thereby the separator may easily buckles by vibration or fallen impact on transferring or carrying the battery. As a result, there is a possibility to cause internal short circuit in the battery. In addition, the content of the alkaline resistant synthetic fiber in the alkaline resistant fiber can be adjusted depending on the content of the alkaline resistant cellulose fiber, and the content of the alkaline resistant synthetic fiber may be, for example, preferably about 10 to 60 mass %, and more preferably about 15 to 50 mass % in the base nonwoven layer.

Further, the binder content may be preferably about 5 to 30 mass % in the base nonwoven layer. If the content of the binder is too low, the separator using the binder could not attain the sufficient tensile strength for producing batteries. On the contrary, if the content of the binder are too high, the binder fills (clogs) into the void spaces in the fibers of the nonwoven material so that the separator using the high-content binder would deteriorate in electrolyte absorption or increase electrical resistance of the battery.

One embodiment for producing a nonwoven material as the base layer will now be described in detail. Alkaline resistant fibers, if necessary refined at a predetermined fiber freeness, are mixed with a binder, and the resultant mixture is wetlaid to give a nonwoven material. The method for producing the nonwoven material by a wet process is not particularly limited to a specific one, and general papermaking machines for wetlaying can be used to produce a desired nonwoven material in an efficient way. As the papermaking machine, use can be made of general papermaking machines such as a cylinder making machine, a tanmo (paper) machine, a Fourdrinier (paper) machine, or if necessary, a combination thereof.

Thereafter, thus obtained undried nonwoven material is dried with a contact-type (for example, Yankee type) dryer to produce a nonwoven material used in the battery separator of the present invention.

(Separator)

In a battery separator of the present invention, a base layer having resistance to alkaline electrolytes as well as being excellent in wettability to the electrolytes is joined to a nanofiber layer comprising a modified PVA polymer so as to be unified with the nanofiber layer. The present separator not only achieves high absorption of alkaline electrolytes but also effectively prevents the battery from internal short circuit by improvement in blocking ability of the minute void spaces between the swollen nanofibers which are supported by the base layer.

The thicknesses, basis weights, densities of the nanofiber and base layers can be set in appropriate ranges as far as the separator achieves both the absorption of the electrolyte and the blocking ability. It should be noted that if necessary the thickness of the separator can be adjusted so as to have a desirable one by pressing under heating or cooling.

For example, the nanofiber layer to be accumulated on the base layer may preferably have a basis weight of about 0.1 to 10.0 g/m$^2$, and more preferably about 0.2 to 5.0 g/m$^2$. Further, the nanofiber layer may preferably have a thickness of about 0.5 to 30 µm, and more preferably about 1 to 25 µm.

In the case where the amount of the accumulated nanofiber is too low, the separator comprising such a nanofiber layer cannot effectively inhibit internal short circuit caused by the needle-like dendrite formation. In contrast, too much amount of the nanofiber contributes to high impedance (resistance value) of the separator itself, resulting in deterioration in battery performance. Further, too much amount of the nanofiber may lead to increased thickness of the separator after absorption of the electrolyte, and the separator may take a lot of space in the battery. Thereby, the limited capacity (space) for cathode and anode mix leads to insufficient charge and discharge performance of the battery.

On the contrary, the desired thickness and basis weight of the base layer can be selected depending on factors such as the thickness of the nanofiber layer and the liquid adsorption amount required in the separator. For example, the base layer may have a thickness of about 3- to 70-folds of that of the nanofiber layer, preferably about 4- to 60-folds thereof, The basis weight of the base layer may be 2- to 35-folds of that of the nanofiber layer, preferably 2.5- to 30-folds thereof.

Moreover, in view of attaining good blocking ability, the density of the nanofiber layer may be about 0.2 to 0.7 g/cm$^3$, and preferably about 0.3 to 0.6 g/cm$^3$. On the contrary, the density of the base layer may be, in order to support the nanofiber layer, about 0.1 to 0.5 g/cm$^3$, and preferably about 0.15 to 0.4 g/cm$^3$. The proportion of the density of the base layer relative to that of the nanofiber layer may be preferably (base layer)/(nanofiber layer)=about 0.2 to 0.9, and more preferably about 0.3 to 0.8, for enhancing the absorption of electrolytes as well as the blocking property of the separator.

The rate of change in air permeability between before and after absorption of the alkaline liquid (electrolyte) can be a useful index showing (i) the electrolyte retention level of a sheet which affects the battery performance at the end of discharge, and (ii) the range of void spaces at which a separator can effectively prevent batteries from internal short circuit due to the dendrite formation. In general, a sheet having a higher change rate in air permeability shows good absorption of electrolyte in the alkaline electrolyte solution, and enhances its blocking ability due to the swollen fibers. The composite sheet used in the present invention may preferably have a rate of change in air permeability of about 30 to 300%, and more preferably about 40 to 100%. Too low rate of change in air permeability of the sheet may deteriorate the absorption of electrolytes by fibers, and may easily cause electrolyte dry-out at the end of discharge. Further, the sheet having such a low rate of change will not obtain the sufficient effect for reducing void size in the sheet, and thereby the sheet cannot prevent batteries from internal short circuit due to the needle-like dendrite formation caused by zinc oxide. In contrast, too high rate of change may cause higher internal resistance due to a low amount of ions passing through, and resulted in unsatisfactory battery performance.

Moreover, in the present invention, some important characteristic is that the separator for alkaline batteries comprises a unified composite sheet in which the fibers in the base layer also has a high absorption level of electrolytes. In fact, the longevity of the battery life is dependent on the electrolyte-absorption level of every fiber constituting the composite sheet. Even if the composite sheet has a high liquid retention amount, such a liquid amount does not necessarily to lead to the prolonged battery life. Sometimes the low liquid adsorption amount of the base layer fibers in the composite sheet easily causes the partial dry-out of the electrolyte inside the base layer. Thereby such a dry-out part of the electrolyte in the base layer causes the internal short circuit of the battery. This index is determined with the liquid absorption amount by fibers after immersion in a 35% aqueous solution of KOH. To be more precise, the liquid absorption amount by fibers in the base layer may be preferably from about 1.0 to 3.0 g/g, and more preferably about 1.2 to 2.0 g/g. In the case where the liquid absorption amount by fibers in the base layer is too low, the battery life of the separator with the base layer is decreased due to deficiency in liquid absorption amount by fibers constituting the base layer and following electrolyte dry-out in the separator. On the other hand, too high liquid absorption amount by fibers leads to increase in thickness of the separator after absorption of the liquid, and the increased thickness of the separator contributes to limited amount of the cathode and anode materials in the battery. As a result, the battery comprising such a separator deteriorated in battery performance.

The battery performance is affected by not only the liquid absorption amount by fibers in the whole composite sheet, but also the liquid absorption amount by fibers constituting the nanofiber layer. It is necessary for the nanofiber layer of the present invention that the liquid absorption amount by fibers is 4.0 to 40.0 g/g, and preferably about 5.0 to 20.0 g/g. In the case where the liquid absorption amount by nanofibers is lower than 4.0 g/g, the nanofiber layer may produce an electrolyte dry-out part in the nanofiber layer, and resulting in increased internal resistance of the battery. On the contrary, if the liquid absorption amount by nanofibers is higher than 40.0 g/g, the nanofibers swell too much. As a result, the swollen nanofibers straiten void spaces in the composite sheet, and thereby internal resistance of the battery increases. Accordingly, it is difficult to obtain satisfactory battery performance from such a separator.

Further, in view of excellent liquid absorption level of electrolytes, the composite sheet preferably has a liquid absorption amount by fibers of about 1.5 to 4.0 g/g, and more preferably about 1.6 to 3.0 g/g.

Further, in the present invention, since the base layer and the nanofiber layer are bonded tightly together even without an adhesive agent, the composite sheet has greater peeling strength needed for separating the nanofiber layer from the base layer. For example, in a sample of 30 mm wide and 170 mm long, the ultimate load (peeling strength) to be needed for separating 50 mm of the nanofiber layer from the base layer in the longitudinal direction from one edge of the sample may be preferably about 10 to 100 g/30 mm, and more preferably about 13 to 80 g/30 mm. According to the tight bonding between the base layer and the nanofiber layer, the separator can enhance the absorption amount of electrolytes as a whole.

As described above, in order to produce a battery having enhanced performance as well as prolonged battery life, it is preferred in the battery to increase a capacity space for the cathode and anode, and to reduce a space for the separator. To be more precise, the separator may have a thickness after absorption of electrolytes of preferably about 0.08 to 0.30 mm, and more preferably about 0.08 to 0.25 mm.

Further, in order to secure the sufficient electrogenic reaction in the battery, the separator may have good ion conductivity as well as have low impedance of the separator itself. As a standard of the battery life, in particular, the electrical resistance of the electrolyte-drained separator may be preferably 3.5Ω or lower, and particularly 0.5 to 3.0Ω.

According to the separator for alkaline batteries of the present invention, an alkaline battery is obtained which has an enhanced performance, particularly a discharge performance durable under high loading, and has a prolonged battery life. The shape of the separator in the alkaline batteries is not particularly limited to a specific one, and may include a cross strip type (a separator having a cross-shaped and based cylindrical form), a round strip type (a separator having a cylindrical form by rolling), a spiral strip type (a separator rolled in a spiral way), and the like. In particular, in the case where the separator for alkaline batteries of the present invention is installed into alkaline batteries, it is preferable that the separator is disposed between the cathode and the anode in such a manner that the nanofiber surface is facing the cathode.

Electrode materials for alkaline batteries may include, as the anode active material, a gelled matter comprising zinc oxide, 40% aqueous solution of KOH as an electrolyte, a gelatinizing agent, and a zinc powder. The zinc powder to be used is preferably free from mercury, cadmium, and/or lead. In particular, the zinc powder may preferably be a zinc alloy powder comprising at least one member selected from the group consisting of bismuth, indium, calcium and aluminum. On the contrary, as the cathode, use can be made of a cathode mix comprising manganese dioxide and graphite as a principal component. Further, the preferable cathode mix may be a one which contains nickel oxyhydroxide used for alkaline battery excellent in discharge performance under high loading. It should be noted that the proportion of the manganese dioxide relative to the nickel oxyhydroxide is preferably (manganese dioxide):(nickel oxyhydroxide)=80:20 to 40:60 (mass weight), in order to assure the discharge characteristics of the battery under high loading as well as the advantageous storage stability thereof.

Hereinafter, the present invention will be demonstrated by way of some examples that are presented only for the sake of illustration, which are not to be construed as limiting the scope of the present invention. It should be noted that in the following Examples, physical properties of the Examples and Comparative Examples were evaluated in the following manners.

[Water Dissolution Temperature (° C.)]
Into 400 mL of water (20° C.), 2.6 g of a sample fiber was added, and the mixture was agitated with heating at the rate of temperature increase of 1° C. per minute, and the agitating speed of 280 rpm. The temperature at which all of the sample fibers were completely dissolved in the water was determined as a water dissolution temperature.

[Fiber Freeness (CSF; mL)]
In accordance with "the test method for fiber freeness of pulp" of Japanese Industrial Standards P 8121, the Canadian standard fiber freeness was determined.

[Basis Weight (g/m$^2$)]
In accordance with "the determination method for basis weight (grammage) per meter of paper" of Japanese Industrial Standards P 8124, the basis weight was determined.

[Thickness (mm)]
The thickness of the obtained separator was determined by measuring 5 spots in the separator with PEACOCK Dial-Thickness Gauge H Type ($\phi$10 mm×180 g/cm$^2$) after leaving the separator under a reference atmosphere (20° C.×65% RH) for 4 hours or over.

[Air Permeability (second/300 cc)]
The air permeability was determined in accordance with Japanese Industrial Standards P 8117 "a test method for air permeability of paper".

[Rate of Change in Air Permeability Between Before and after Absorption of Alkaline Liquid (%)]
A sample of 100 mm by 100 mm was immersed in a 35% aqueous solution of KOH (20° C.) at a bath ratio of 1:100 for 30 minutes, then the immersed sample was drained without suction for 30 seconds. Thereafter, the drained sample was further subjected to centrifugal dehydration (3,000 rpm×10 minutes), and the air permeability of the dehydrated sample was determined in accordance with the above air permeability criteria, and a rate of change in air permeability between before and after absorption was calculated by the following formula:

Change rate in air permeability (%)=($S2$−$S1$)/$S1$ wherein, S1 denotes air permeability of an untreated sample, and S2 denotes air permeability of an alkali-treated sample treated after centrifugal dehydration.

[Liquid Absorption Amount by Fibers (g/g)]
A sample of 50 mm by 50 mm was immersed in a 35% aqueous solution of KOH (20° C.) at a bath ratio of 1:100 for 30 minutes, then the immersed sample was drained without suction for 30 seconds. Thereafter, the drained sample was further subjected to centrifugal dehydration (3,000 rpm×10 minutes), and the mass weight of the dehydrated sample was determined in accordance with the following formula:

Liquid absorption amount by fibers (g/g)=($W2$−$W1$)/$W1$ wherein W1 denotes the mass weight of an untreated sample, and W2 denotes the mass weight of an alkali-treated sample after centrifugal dehydration.

Incidentally, the liquid absorption amount by fibers in a nanofiber layer (Wn) was calculated by the following formulae (1) to (3) after obtaining the liquid absorption amount by fibers in a composite sheet (Wc) and the liquid absorption amount by fibers in a base sheet (Wb) which constitutes the composite sheet; that is, $Wb=(Wb2-Wb1)/Wb1$ (1)

$Wc=(Wc2-Wc1)/Wc1$ (2)

$Wn=Wc-Wb$ (3)

wherein, Wb1 denotes a mass weight of an untreated sample of a base sheet, Wb2 denotes a mass weight of an alkali-treated sample of the base sheet after centrifugal dehydration, Wc1 denotes a mass weight of an untreated sample of a composite sheet, and Wc2 denotes a mass weight of an alkali-treated sample of the composite sheet after centrifugal dehydration.

[Impedance (Resistance Value)]

A sample was immersed, drained and dehydrated in the same way as those of the above-described indexes for the total liquid adsorption amount and the liquid absorption amount by fibers. That is, a sample was immersed in a 35% aqueous solution of KOH (20° C.) at a bath ratio of 1:100 for 30 minutes, then the immersed sample was drained without suction for 30 seconds so that the sample still contained sufficient liquid in their voids. Subsequently, the drained sample was further subjected to centrifugal dehydration (3,000 rpm×10 minutes) so that the sample only contained liquid (electrolyte) in fibers. Thereafter, impedance of the sample was measured with impedance measuring equipment ("KC-547 LCR METER" manufactured by KOKUYO Electric) under a measuring atmosphere of 20° C.×65% RH with maintaining the constant thickness of the sample (0.100 mm).

[Peeling Strength Evaluation]

A sample (i.e., a composite sheet comprising a base layer and a nanofiber layer) of 30 mm wide and 170 mm long was prepared, and a peeling test was conducted by peeling the nanofiber layer from the base layer from one edge of the sample to further 50 mm in the longitudinal direction with a tensile testing machine ("Model 5540" manufactured by Instron). The strength for peeling was measured, and the ultimate load (peeling strength) to be needed for peeling was regarded as the peeling strength.

[Evaluation of Battery Performance after Thermal Fatigue]

As an evaluation method for battery performance, the discharge performances of a size AA alkaline battery produced by a below-mentioned method were evaluated both immediately after production and after storage at high temperature (storage for 3 days at 80° C.). More specifically, the battery was made with a separator and a cathode containing manganese dioxide and graphite mixture, then the discharge performances of the battery were evaluated by measuring a discharge period until the final voltage of the battery becomes 0.9 V over intermittent discharge of every 5 minutes per day under the load of 3.9 Ω at the ambient temperature of 20° C. The obtained values in each of the Examples and Comparative Examples were transformed into a relative value to the discharge period of the battery obtained from Comparative Example 5, by regarding the respective discharge periods immediately after production and after storage at the high temperature in Comparative Example 5 as 100. In the case where the relative values of the discharge periods both immediately after production and after storage at the high temperature are more than 100, the battery is estimated to have a prolonged battery life without internal short circuit and oxidation degradation, and classified into the following criteria: good (more than 100 and less than 105), excellent (not less than 105), and poor (not more than 100). It should be noted that the method for producing the battery is described in Example 1 in more detail.

[Evaluation of Battery Performance Under Easy Short Circuit Condition]

As an evaluation method for battery performance, the discharge performances of a size AA alkaline battery produced by a below-mentioned method were evaluated. More specifically, the battery was made with a separator and a cathode containing manganese dioxide and graphite mixture, then the discharge performances of the battery were evaluated by measuring a discharge period until the final voltage of the battery becomes 0.9 V over continuous discharge under the load of 300Ω at the ambient temperature of 0° C. at which batteries tend to cause internal short circuit due to the dendrite formation. The values obtained in each of the Examples and Comparative Examples were transformed into a relative value to the discharge period of the battery obtained from Comparative Example 5, by regarding the discharge period in Comparative Example 5 as 100. In the case where the relative value of the discharge period is 110 or over, the battery is estimated to have a prolonged battery life without internal short circuit and oxidation degradation, and classified into the following criteria: good (not less than 110 and less than 130), excellent (not less than 130), and poor (less than 110). It should be noted that the method for producing the battery is described in Example 1 in more detail.

EXAMPLE 1

(1) First, as a raw material, were mixed 35 mass % of a PVA main fiber ("VPB103×3" manufactured by Kuraray Co., Ltd.; 1.1 dtex×3 mm), 15 mass % of a PVA binder fiber ("VPB105-1" manufactured by Kuraray Co., Ltd.; 1.1 dtex×3 mm, having a water dissolution temperature of 70° C.), and 50 mass % of an organic solvent-spun rayon fiber ("Tencel" (trademark) manufactured by Lenzing; 1.7 dtex×2 mm, refined to have a CSF value of 300 mL with a high-speed refining machine), then the resultant mixture was wetlaid with a Fourdrinier machine, subsequently the resultant undried nonwoven material was dried with a Yankee drier to obtain a wet-type nonwoven base layer having a basis weight of 22.9 g/m$^2$, and a thickness of 0.10 mm.

(2) Second, in order to form a nanofiber layer, a modified PVA polymer ("KM-118" manufactured by Kuraray Co., Ltd., polymerization degree of 1780, saponification value of 98 mol %, modified with 2 mol % of maleic acid) was added into water in the concentration of 10 mass %, then the resultant mixture was agitated for dissolving at 90° C. Thereafter, the solution was cooled to an ambient temperature to obtain a spinning solution (surface tension of 48.8 dyne/cm). By using thus obtained spinning solution, electro spinning was conducted with a spinning machine of FIG. 1. A needle having an inside diameter of 0.9 mm was used as the nozzle 3. Further, the distance between the nozzle 3 and the earthed conductive member 6 (i.e., the distance between the conductive materials) was 8 cm. Incidentally, the base layer obtained in the procedure of (1) was placed on a sheet-forming machine (not shown) which comprises the grounded (earthed) conductive member 6. Then, the spinning solution was extruded from the nozzle 3 at a predetermined supply amount to a drawing machine moving at a conveyer speed of 0.1 m per minute, with applying the voltage of 20 kV to the nozzle 3 to form a nanofiber layer (fiber diameter of the nanofiber: 250 nm) at the basis weight of 1.0 g/m$^2$ on the nonwoven base layer to give a composite sheet comprising the nanofiber layer and the base layer covered with the nanofiber layer. The properties of thus obtained composite sheet are shown in Table 1.

(3) Third, for evaluation of the battery performances, a battery was made in the following manner. That is, a cathode material was made by uniformly mixing 94.3 mass % of manganese dioxide, 4.8 mass % of a graphite powder, and 0.93 mass % of an electrolyte comprising a 40 mass % aqueous solution of KOH with an agitating machine. It should be noted that the manganese dioxide and the graphite powder were selected to have a particle size of 20 to 50 μm, and 10 to 25 μm respectively. Then, the cathode material obtained by the above method was compression molded into a pellet having a short cylindrical form.

(4) On the other hand, as the anode complex, a gelled anode was used which was prepared by mixing 1 mass % of polyacrylic acid sodium salt as a gelatinizing agent, 33 mass % of an aqueous solution of KOH (40 mass %), 66 mass % of zinc alloy powder, and further adding potassium silicate into the mixture in the concentration of silica being 50 ppm relative to the zinc powder. It should be noted that the zinc alloy powder contains 200 mass % of bismuth, and 500 mass % of indium, and 30 mass % of aluminum relative to the zinc powder amount.

(5) By using thus obtained pellet of cathode mix, the gelled anode, and the separator and further a bottom paper ("CSBI" manufactured by Kuraray Co., Ltd.), a battery was assembled in which the separator had a round strip type (having a cylindrical form by rolling). Then, discharge tests of the resultant battery were conducted for evaluating (i) the battery performance after its thermal fatigue and (ii) the battery performance under the condition which the battery was susceptible to short circuit. The discharge tests revealed that the battery did not cause oxidation degradation at electrodes, and had a prolonged battery life not only by preventing the battery from electrolyte dry-out at the end of discharge but also by preventing the battery from internal short circuit over discharge at the low temperature at which the battery tended to form dendrite because the nanofiber layer enhanced the electrolyte retention as well as blocking effect even under such sever conditions. These results are shown in Table 1.

EXAMPLE 2

Except that the concentration of the spinning solution of the PVA polymer for the nanofiber was changed into 11 mass % (surface tension of 48.9 dyne/cm), and the distance between the nozzle 3 and the earthed conductive member 6 (i.e., the distance between the conductive materials) was changed into 7 cm in FIG. 1, a composite sheet and a battery were obtained in the same way with those of Example 1. In thus obtained composite sheet, the nanofiber layer had larger fiber diameter, and slightly lower property than Example 1. However, the battery still showed enhanced battery performance. The properties of the composite sheet and the evaluation results of the battery performances are shown in Table 1.

EXAMPLE 3

Except that the concentration of the spinning solution of the PVA polymer for the nanofiber was changed into 6 mass % (surface tension of 47.4 dyne/cm), and the distance between the nozzle 3 and the earthed conductive member 6 (i.e., the distance between the conductive materials) was changed into 7 cm in FIG. 1, a composite sheet and a battery were obtained in the same way with those of Example 1. In thus obtained composite sheet, the nanofiber layer attained higher absorption of electrolyte and effective blocking because of finer and more tangled structure of the nanofiber layer than that of Example 1. Further, the battery had sufficient and enhanced discharge performance required for the battery. The properties of the composite sheet and the results of evaluation of the battery performances are shown in Table 1.

EXAMPLE 4

Except that the overlaying amount of the nanofiber layer was changed into 4.2 g/m$^2$, a composite sheet and a battery were obtained in the same condition with those of Example 1. In thus obtained composite sheet, the nanofiber layer attained high absorption of electrolyte, and effective blocking because of heavier thickness of the nanofiber layer than that of Example 1. Further, the battery had sufficient and enhanced discharge performance as the battery. The properties of the composite sheet and the evaluation results of the battery performances are shown in Table 1.

EXAMPLE 5

Except that the overlaying amount of the nanofiber layer was changed into 7.6 g/m$^2$, a composite sheet and a battery were obtained in the same way with those of Example 1. In thus obtained composite sheet, the nanofiber layer accomplished higher absorption of electrolyte, and effective blocking because of higher thickness of the nanofiber layer than that of Example 1. Further, the battery had sufficient and enhanced discharge performance as the battery. The properties of the composite sheet and the evaluation results of the battery performances are shown in Table 1.

COMPARATIVE EXAMPLE 1

(1) As with the case of Example 1, as a raw material, were mixed 35 mass % of a PVA main fiber ("VPB103×3" manufactured by Kuraray Co., Ltd.; 1.1 dtex×3 mm), 15 mass % of a PVA binder fiber ("VPB105-1" manufactured by Kuraray Co., Ltd.; 1.1 dtex×3 mm having a water dissolution temperature of 70° C.), and 50 mass % of an organic solvent-spun rayon fiber ("Tencel" (trademark) manufactured by Lenzing, 1.7 dtex×2 mm, refined to have a CSF value of 300 mL with a high-speed refining machine), then the resultant mixture was wetlaid to a two-layer structure with the combination of a tanmo paper-making machine and a cylinder paper-making machine, subsequently the resultant undried nonwoven material was dried with a Yankee drier to obtain a wet-type nonwoven base layer having a basis weight of 22.9 g/m$^2$, and a thickness of 0.10 mm.

(2) Second, in order to form a nanofiber layer, polyacrylonitrile (manufactured by Mitsubishi rayon Co. Ltd.; molecular weight of 15,000; hereinafter referred to as "PAN") was added into dimethylformamide in the concentration of 10 mass %, then the resultant mixture was agitated for dissolving to give a spinning solution.

(3) By using thus obtained spinning solution, electro spinning was conducted with the spinning machine of FIG. 1. A needle having an inside diameter of 0.9 mm was used as the nozzle 3. Further, the distance between the nozzle 3 and the earthed conductive member 6 (i.e., the distance between the conductive materials) was 9 cm. Incidentally, the base layer obtained in the above procedure of (1) was placed on a sheet-forming machine (not shown) which comprises the grounded conductive member 6. Then, the spinning solution was extruded from the nozzle 3 at a predetermined supply amount to a drawing machine moving at a conveyer speed of 0.1 m per minute, with applying the voltage of 20 kV to the nozzle 3 to form a nanofiber layer (fiber diameter of the nanofiber: 250 nm) at the basis weight of 1.0 g/m$^2$ on the nonwoven base layer to give a composite sheet comprising the nanofiber layer and the base layer covered with the nanofiber layer. The properties of thus obtained composite sheet are shown in Table 1.

Then, the spinning solution was extruded from the nozzle 3 at a predetermined supply amount to a drawing machine moving at a conveyer speed of 0.1 m per minute, with applying the voltage of 20 kV to the nozzle 3 to form a nanofiber layer (fiber diameter of the nanofiber: 250 nm) at the basis weight of 1.0 g/m$^2$ on the nonwoven base layer to give a composite sheet comprising the nanofiber layer and the base layer covered with the nanofiber layer. In thus obtained composite sheet, the nanofiber layer easily detached from the base layer. Further, the liquid absorption amount by fibers in the separator was similar to that at the end of discharge due to the low liquid absorption amount by fibers in the nanofiber layer. Furthermore, the higher resistance value was found after electrolyte dry-out, and the battery had a short battery life when the practical evaluation of the battery performances.

COMPARATIVE EXAMPLE 2

Except that the concentration of the spinning solution of a PVA polymer for nanofiber was changed into 14 mass % (surface tension 53.6 dyne/cm), and the distance between the nozzle 3 and the earthed conductive member 6 (i.e., the distance between the conductive materials) was changed into 8 cm in FIG. 1, a composite sheet and a battery were obtained in the same condition with those of Example 1. In thus obtained composite sheet, although the liquid absorption amount by fibers of the separator was sufficient, the nanofiber layer had much larger fiber diameter. Further, in the separator, the air permeability properties before and after absorption of the alkaline liquid used for evaluating the tendency of blocking ability of the separator were not sufficient for blocking, and the battery did not show good battery performances.

COMPARATIVE EXAMPLE 3

As with the case of Example 1, as a raw material, were mixed 35 mass % of a PVA main fiber ("VPB103×3" manufactured by Kuraray Co., Ltd.; 1.1 dtex×3 mm), 15 mass % of a PVA binder fiber ("VPB105-1" manufactured by Kuraray Co., Ltd.; 1.1 dtex×3 mm having a water dissolution temperature of 70° C.), and 50 mass % of an organic solvent-spun rayon fiber ("Tencel" (registered trademark) manufactured by Lenzing; 1.7 dtex×2 mm, refined to have a CSF value of 300 mL with a high-speed refining machine), then the resultant mixture was wetlaid to have a two layer structure with a composite paper-making machine having a tanmo paper-making unit and a cylinder paper-making unit, subsequently the resultant wetlaid nonwoven material was dried with a Yankee drier to obtain a wet-type nonwoven base layer having a basis weight of 36.8 g/m$^2$, and a thickness of 0.13 mm.

Without covering the obtained nonwoven material with a nanofiber layer, the nonwoven material was evaluated as the separator. The separator had the lowest liquid absorption amount by fibers, and did not have the air permeability which could prevent internal short circuit.

COMPARATIVE EXAMPLE 4

Except that the PVA polymer for nanofiber was changed into an unmodified PVA polymer ("PVA-217" manufactured by Kuraray Co., Ltd., polymerization degree of 1700, saponification value of 88 mol %), a composite sheet and a battery were obtained in the same way with those of Example 1. In thus obtained sheet, the liquid absorption amount by fibers in the separator declined because of the saponification of the polymer in the alkaline liquid, and had insufficient retention of the electrolyte as well as deficient improvement in blocking property by swelling. The resultant battery had inferior battery performance. The result is shown in Table 2.

COMPARATIVE EXAMPLE 5

Except that the PVA polymer for nanofiber was changed into an unmodified PVA polymer "PVA-217" manufactured by Kuraray Co., Ltd. (polymerization degree of 1700, saponification value of 88 mol %) and that the overlaying amount of a nanofiber layer was changed into 5.5 g/m$^2$, a composite sheet and a battery were obtained in the same way with those of Example 1. In thus obtained sheet, the liquid absorption amount by fibers in the nanofiber layer was low. Accordingly, in the case where the thickness of the nanofiber layer was increased, the resistance value of the separator itself increased, resulting in inferior battery performance of the battery. The result is shown in Table 2.

TABLE 1

| | | Example 1 | Example 2 | Example 3 | Example 4 | Example 5 |
|---|---|---|---|---|---|---|
| Nanofiber layer | Polymer | Modified PVA | Modified PVA | Modified PVA | Modified PVA | Modified PVA |
| | Fiber diameter (nm) | 250 | 800 | 30 | 250 | 250 |
| | Basis weight (g/m$^2$) | 1.0 | 1.0 | 1.0 | 4.2 | 7.6 |
| | Thickness (mm) | 0.002 | 0.003 | 0.002 | 0.011 | 0.021 |
| | Density (g/cm$^3$) | 0.50 | 0.33 | 0.50 | 0.38 | 0.36 |
| | Liquid absorption amount by fibers (g/g) | 11.2 | 9.3 | 14.2 | 9.7 | 7.5 |
| Base layer | PVA main fiber (mass %) | 35 | 35 | 35 | 35 | 35 |
| | Cellulose fiber (mass %) | 50 | 50 | 50 | 50 | 50 |
| | PVA binder (mass %) | 15 | 15 | 15 | 15 | 15 |
| | Basis weight (g/m$^2$) | 22.9 | 22.9 | 22.9 | 22.9 | 22.9 |
| | Thickness (mm) | 0.108 | 0.104 | 0.107 | 0.114 | 0.108 |
| | Density (g/cm$^3$) | 0.21 | 0.22 | 0.21 | 0.20 | 0.21 |
| | Liquid absorption amount by fibers (g/g) | 1.2 | 1.2 | 1.2 | 1.2 | 1.2 |
| Composite sheet | Basis weight (g/m$^2$) | 24.0 | 24.0 | 24.0 | 27.1 | 33.5 |
| | Thickness (mm) | 0.110 | 0.107 | 0.109 | 0.125 | 0.129 |
| | Density (g/cm$^3$) | 0.22 | 0.22 | 0.22 | 0.22 | 0.26 |
| | Air permeability (second/300 cc) | 1.3 | 1.1 | 2.0 | 4.2 | 12.5 |
| | Liquid absorption amount by fibers (g/g) | 1.6 | 1.6 | 1.6 | 1.8 | 2.1 |
| | Resistance value after dehydration (Ω) | 2.2 | 2.2 | 2.1 | 2.6 | 2.9 |
| | Air permeability after dehydration (second/300 cc) | 1.8 | 1.5 | 3.2 | 8.6 | 43.2 |
| | Change in air permeability (%) | 39 | 36 | 60 | 108 | 246 |
| | Peeling strength (g/30 mm) | 22 | 19 | 24 | 22 | 22 |
| Battery performance | Discharge after thermal fatigue | Excellent | Good | Excellent | Excellent | Good |
| | Discharge under easy short circuit condition | Excellent (138%) | Good (125%) | Excellent (163%) | Excellent (171%) | Excellent (199%) |

TABLE 2

| | | Com. Example 1 | Com. Example 2 | Com. Example 3 | Com. Example 4 | Com. Example 5 |
|---|---|---|---|---|---|---|
| Nanofiber layer | Polymer | PAN | Modified PVA | — | Unmodified PVA | Unmodified PVA |
| | Fiber diameter (nm) | 250 | 1600 | — | 250 | 250 |
| | Basis weight (g/m$^2$) | 1.0 | 1.0 | — | 1.0 | 5.5 |
| | Thickness (mm) | 0.004 | 0.004 | — | 0.002 | 0.014 |
| | Density (g/cm$^3$) | 0.25 | 0.25 | — | 0.50 | 0.39 |
| | Liquid absorption amount by fibers (g/g) | 1.8 | 6.9 | — | 3.7 | 2.8 |
| Base layer | PVA main fiber (mass %) | 35 | 35 | 35 | 35 | 35 |
| | Cellulose fiber (mass %) | 50 | 50 | 50 | 50 | 50 |
| | PVA binder (mass %) | 15 | 15 | 15 | 15 | 15 |
| | Basis weight (g/m$^2$) | 22.9 | 22.9 | 36.8 | 22.9 | 22.9 |
| | Thickness (mm) | 0.107 | 0.105 | — | 0.108 | 0.114 |
| | Density (g/cm$^3$) | 0.21 | 0.22 | — | 0.21 | 0.20 |
| | Liquid absorption amount by fibers (g/g) | 1.2 | 1.2 | 1.2 | 1.2 | 1.2 |
| Composite sheet | Basis weight (g/m$^2$) | 23.2 | 24.0 | 36.8 | 24.0 | 28.4 |
| | Thickness (mm) | 0.111 | 0.109 | 0.130 | 0.110 | 0.128 |
| | Density (g/cm$^3$) | 0.21 | 0.22 | — | 0.22 | 0.22 |
| | Air permeability (second/300 cc) | 1.4 | 0.8 | 0.6 | 1.2 | 11.1 |
| | Liquid absorption amount by fibers (g/g) | 1.3 | 1.5 | 1.2 | 1.3 | 1.4 |
| | Resistance value after dehydration (Ω) | 3.8 | 2.3 | 2.9 | 2.4 | 4.3 |
| | Air permeability after dehydration (second/300 cc) | 1.5 | 1.0 | 0.7 | 1.4 | 13.6 |
| | Change in air permeability (%) | 7 | 25 | 17 | 17 | 23 |
| | Peeling strength (g/30 mm) | 3 | 17 | — | 19 | 19 |
| Battery performance | Discharge after thermal fatigue | Poor (Detached) | Poor | Poor | Good | Poor |
| | Discharge under easy short circuit condition | Poor (Detached) | Poor (106%) | Poor (100%) | Poor (108%) | Poor (94%) |

INDUSTRIAL APPLICABILITY

According to the present invention, a separator for batteries can be obtained which enhances absorption of electrolytes, and retains the electrolytes for a long period. The separator not only withstands the oxidation degradation caused by cathode mixes, but also prevents batteries from internal short circuit by inhibiting the dendrite formation. Further, the separator itself has a low electrical resistance, and enables to enhance the capacity of cathode and anode materials in the batteries by restraining increase in thickness of the separator even after absorption of the electrolytes.

What is claimed is:

1. A separator for alkaline batteries having a composite sheet comprising:
   a continuous polyvinyl alcohol nanofiber layer formed from a polyvinyl alcohol polymer modified with at least one modifying component and having a fiber diameter of 10 to 1000 nm, the nanofiber layer having a liquid absorption amount by fibers of 4.0 to 40.0 g/g after immersion in a 35% aqueous solution of KOH, wherein the at least one modifying component is an unsaturated carboxylic acid, an unsaturated carboxylic acid derivative, an unsaturated sulfonic acid, an unsaturated sulfonic acid derivative, a borane acid complex, a borane complex, a borane complex derivative, a vinyl ester, an amine, an acrylamide, a methacrylamide, an allyl alcohol, or vinyl pyrrolidone; and
   a base layer joined to the nanofiber layer, the base layer comprising a wet-type nonwoven material made of alkaline resistant fibers and having a density of 0.1 to 0.4 g/cm$^3$, wherein the alkaline resistant fiber is at least one alkaline resistant fiber selected from the group consisting of an alkaline resistant synthetic fiber and an alkaline resistant cellulose fiber; the alkaline resistant synthetic fiber excluding a polyvinyl alcohol polymer modified with an unsaturated carboxylic acid; and the alkaline resistant cellulose fiber being a fibrillated fiber having a refining degree in a CSF value of 0 to 700 mL.

2. The separator for alkaline batteries as claimed in claim 1, wherein the modified polyvinyl alcohol polymer comprises an unsaturated carboxylic acid as the modifying component.

3. The separator for alkaline batteries as claimed in claim 1, wherein the base layer further comprises a polyvinyl alcohol binder.

4. The separator for alkaline batteries as claimed in claim 1, wherein the composite sheet has a peeling strength for separating the nanofiber layer from the base layer of 10 to 100 g/30 mm.

5. The separator for alkaline batteries as claimed in claim 1, wherein the composite sheet has a rate of change in air permeability of 30 to 300% between before and after immersion of a 35% aqueous solution of KOH.

6. The separator for alkaline batteries as claimed in claim 1, wherein the nanofiber layer has a thickness of 0.5 to 30 μm, and the base layer has a thickness of 3 to 70 times higher than that of the nanofiber layer.

7. The separator for alkaline batteries as claimed in claim 1, wherein the nanofiber layer has a basis weight of 0.1 to 10 g/m$^2$, and the base layer has a basis weight of 2 to 35 times higher than that of the nanofiber layer.

8. The separator for alkaline batteries as claimed in claim 1, wherein the nanofiber layer has a density of 0.2 to 0.7 g/cm$^3$, and the ratio of the density of the base layer relative to that of the nanofiber layer is (base layer density)/(nanofiber layer density)=0.2 to 0.9.

9. The separator for alkaline batteries as claimed in claim 1, wherein the composite sheet has a liquid absorption amount by fibers of 1.0 to 3.0 g/g after immersion in a 35% aqueous solution of KOH.

10. A method for producing the separator for alkaline batteries recited in claim 1, comprising
   (A) preparing a spinning solution by dissolving a modified polyvinyl alcohol polymer in a solvent which is capable of dissolving the polymer, and (B) forming polyvinyl alcohol nanofibers from the solution using an electro spinning method thereby forming a nanofiber layer onto a base layer to produce a composite sheet.

11. A battery comprising the separator for alkaline batteries of claim 1.

12. A battery, comprising the separator for alkaline batteries of claim 2.

13. A battery, comprising the separator for alkaline batteries of claim 3.

14. A battery, comprising the separator for alkaline batteries of claim 4.

15. A battery, comprising the separator for alkaline batteries of claim 5.

16. A battery, comprising the separator for alkaline batteries of claim 6.

17. A battery, comprising the separator for alkaline batteries of claim 7.

18. A battery, comprising the separator for alkaline batteries of claim 8.

* * * * *